United States Patent
Agara et al.

(10) Patent No.: US 11,041,438 B2
(45) Date of Patent: Jun. 22, 2021

(54) GAS TURBINE ENGINE SERVICE TUBE MOUNT

(71) Applicant: General Electric Company, Schenectady, NY (US)

(72) Inventors: Karthik Gopal Rao Agara, Karnataka (IN); Edward Joseph Stiftar, West Chester, OH (US); Caitlin Marie Ford, Cincinnati, OH (US); Vinodh Rajagopalan, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 15/091,604

(22) Filed: Apr. 6, 2016

(65) Prior Publication Data
US 2017/0292449 A1 Oct. 12, 2017

(51) Int. Cl.
| F02C 7/06 | (2006.01) |
| F01D 25/18 | (2006.01) |
| F01D 9/06 | (2006.01) |
| F01D 25/04 | (2006.01) |

(52) U.S. Cl.
CPC ............. *F02C 7/06* (2013.01); *F01D 9/065* (2013.01); *F01D 25/04* (2013.01); *F01D 25/18* (2013.01)

(58) Field of Classification Search
CPC . F02C 7/06; F01D 25/18; F01D 25/04; F01D 9/065; F16L 3/01; F16L 3/16; F16L 3/20; F16L 3/205; F16L 27/12; F16L 55/02; F16L 55/07
See application file for complete search history.

(56) References Cited

U.S. PATENT DOCUMENTS

| 4,084,843 | A | * | 4/1978 | Gassert | ............ F16L 37/091 285/105 |
| 5,526,640 | A | | 6/1996 | Brooks et al. | |
| 5,527,073 | A | | 6/1996 | Readman | |
| 7,096,845 | B1 | | 8/2006 | Vaandrager et al. | |
| 7,367,427 | B2 | | 5/2008 | Gaines et al. | |
| 7,950,886 | B2 | | 5/2011 | Siegal | |
| 2014/0030088 | A1 | | 1/2014 | Coffin et al. | |
| 2014/0205447 | A1 | * | 7/2014 | Patat | ............ F01D 9/065 415/177 |
| 2015/0219011 | A1 | | 8/2015 | Muldoon et al. | |

* cited by examiner

*Primary Examiner* — Katheryn A Malatek
(74) *Attorney, Agent, or Firm* — Hanley, Flight and Zimmerman, LLC

(57) ABSTRACT

An apparatus and method of biasing a service tube within a turbine rear frame of a gas turbine engine. The engine includes an engine core having a service fitting. A service tube is mounted to the service fitting and at least one support mount secures the service tube to the engine core. A spring element on the support mount can provide a biasing force to the service tube.

19 Claims, 9 Drawing Sheets

GAS TURBINE ENGINE SERVICE TUBE MOUNT

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades.

Gas turbine engines for aircraft often require lubrication of moving components. In order to keep these components lubricated, oil or an oil/air mixture is fed through the engine to these components. In particular, a service tube disposed within an engine frame, turbine rear frame, or a strut disposed therein is used to provide the oil or oil/air mixture to radially inner engine components. However, the service tubes within the turbine rear frame can vibrate, especially when the engine operates at the natural frequency of the service tube, which can cause service tube damage.

BRIEF DESCRIPTION OF THE INVENTION

In one aspect, embodiments of the invention relate to a gas turbine engine including an engine core having a service fitting, a service tube mounted to the service fitting, and at least one support mount securing the service tube to the engine core and having at least one spring element applying a biasing force to the service tube.

In another aspect, embodiments of the invention relate to a service tube and at least one support mount circumscribing the service tube and having at least one spring element applying a biasing force to the service tube.

In yet another aspect, embodiments of the invention relate to a method of altering a first resonance frequency of a service tube for a gas turbine engine including applying a biasing force having a component normal to a longitudinal axis of the service tube.

DESCRIPTION OF EMBODIMENTS OF THE INVENTION

The described embodiments of the present invention are directed to systems, methods, and other devices related to routing airflow or oil flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications, including power generation. It should be further understood that while the invention is described in reference to a service tube within a strut and turbine rear frame, it can be advantageous to any service tube assembly within the engine or along the engine frame.

Figure 1:
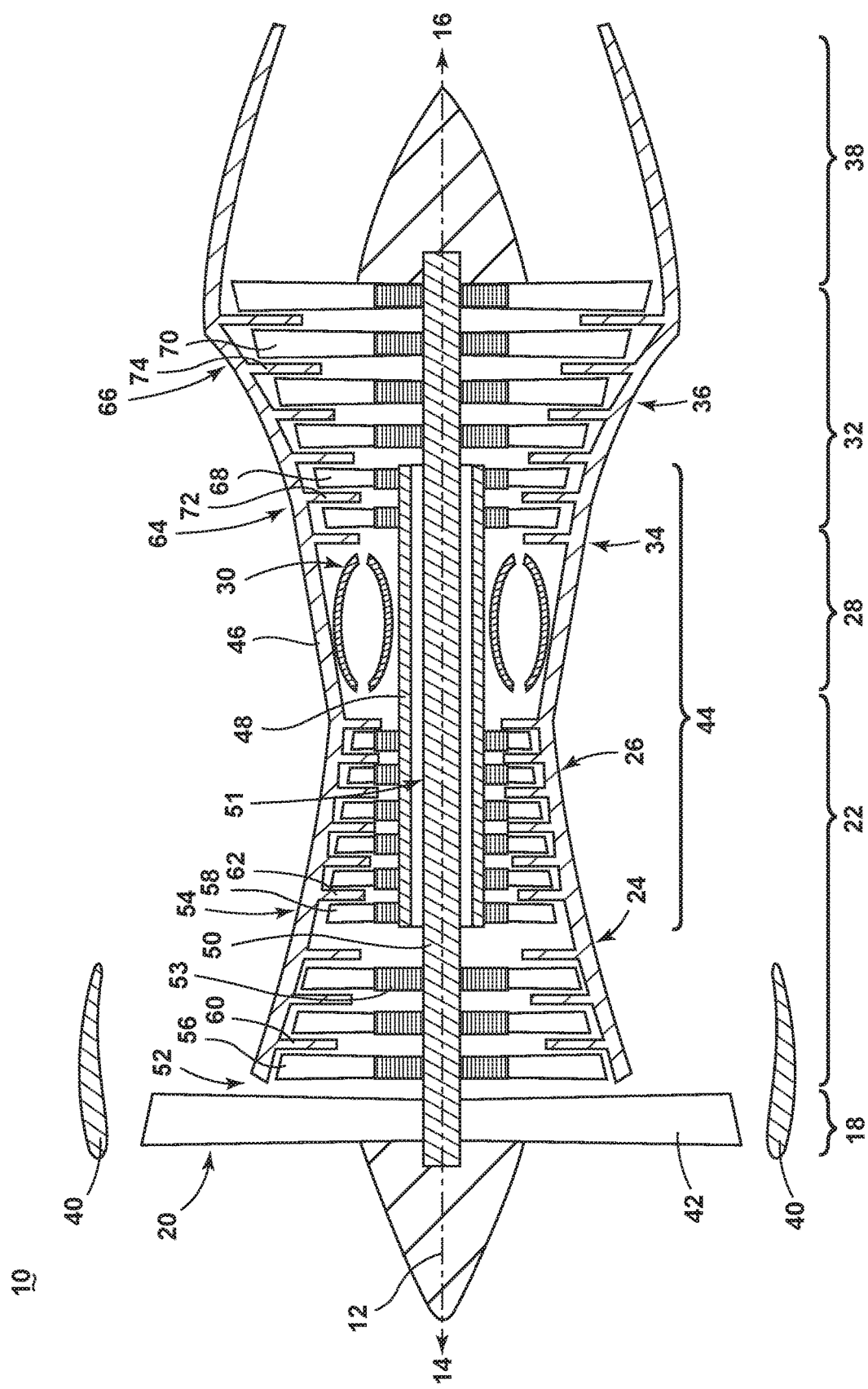
FIG. 1 is a schematic, sectional view of a gas turbine engine.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
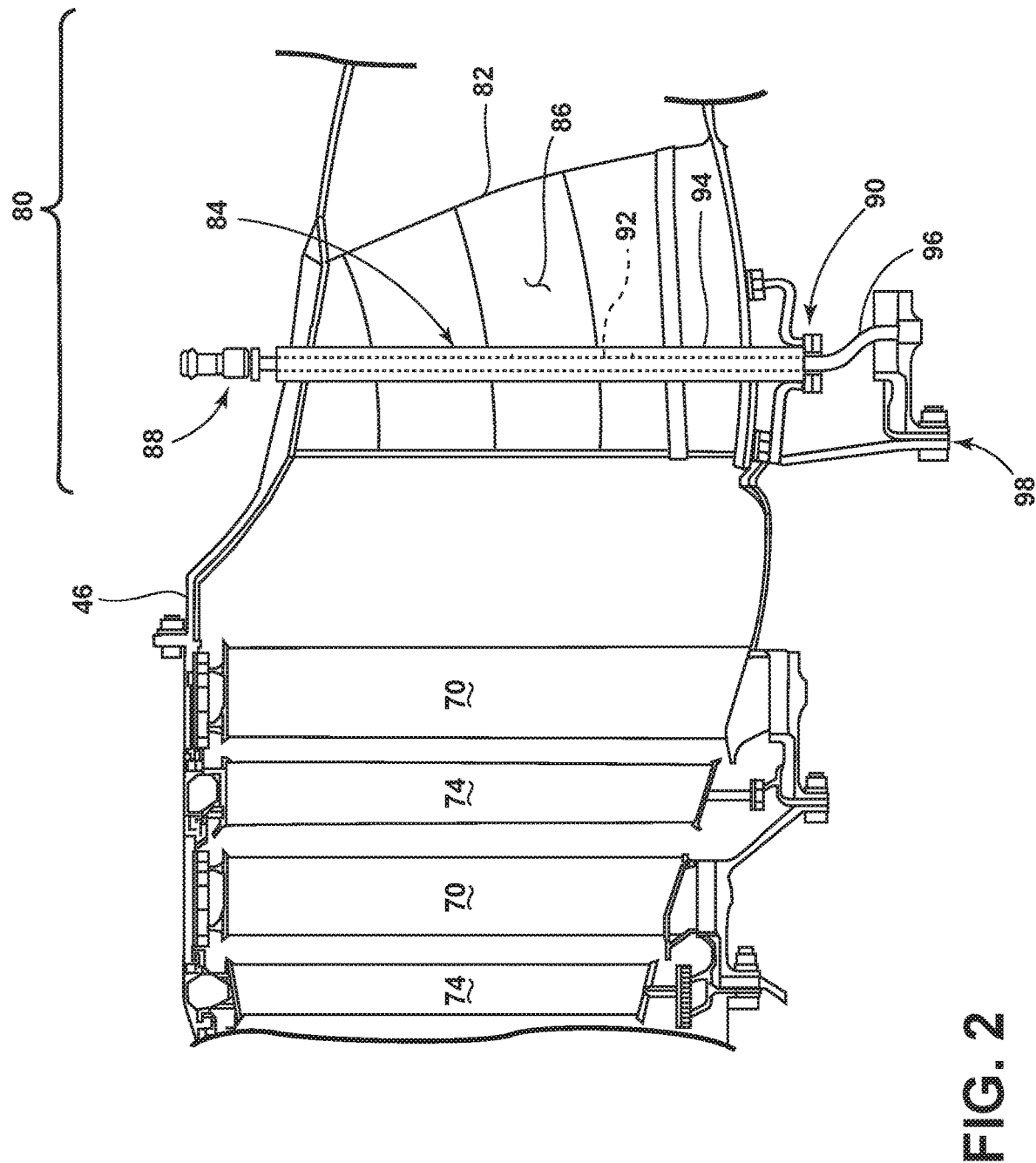
FIG. 2 is a cross-sectional view of a turbine rear frame having a service tube assembly.

Turning to FIG. 2, downstream of the LP turbine section 36 is a turbine rear frame 80 having a plurality of struts 82 disposed radially about the engine centerline 12. The struts 82 can be shaped or oriented to axially direct exhaust fluid from the LP turbine 36. A service tube assembly 84 can be disposed in a hollow interior 86 of the struts 82 for providing oil or an oil/air medium to necessary parts of the engine 10. The service tube assembly 84 includes a service tube 92 surrounded by a heat shield 94. The service tube assembly 84 mounts to the engine casing 46 or a nacelle at a radially outer service fitting 88. An inner service fitting 90 mounts the service tube assembly 84 to a tube conduit 96 which couples to a radially inner casing assembly 98.

During engine operation, the strut 82 and service tube assembly 84 are exposed to vibrational forces. The service tube assembly 84 can have a natural frequency where it can begin to vibrate when the engine vibrates at that natural frequency. Such vibrations can cause contact between the service tube 92 and the heat shield 94 or cause the service tube to bend. The contact or movement of the service tube 92 and heat shield 94 can lead to service tube assembly 84 damage.

Figure 3:
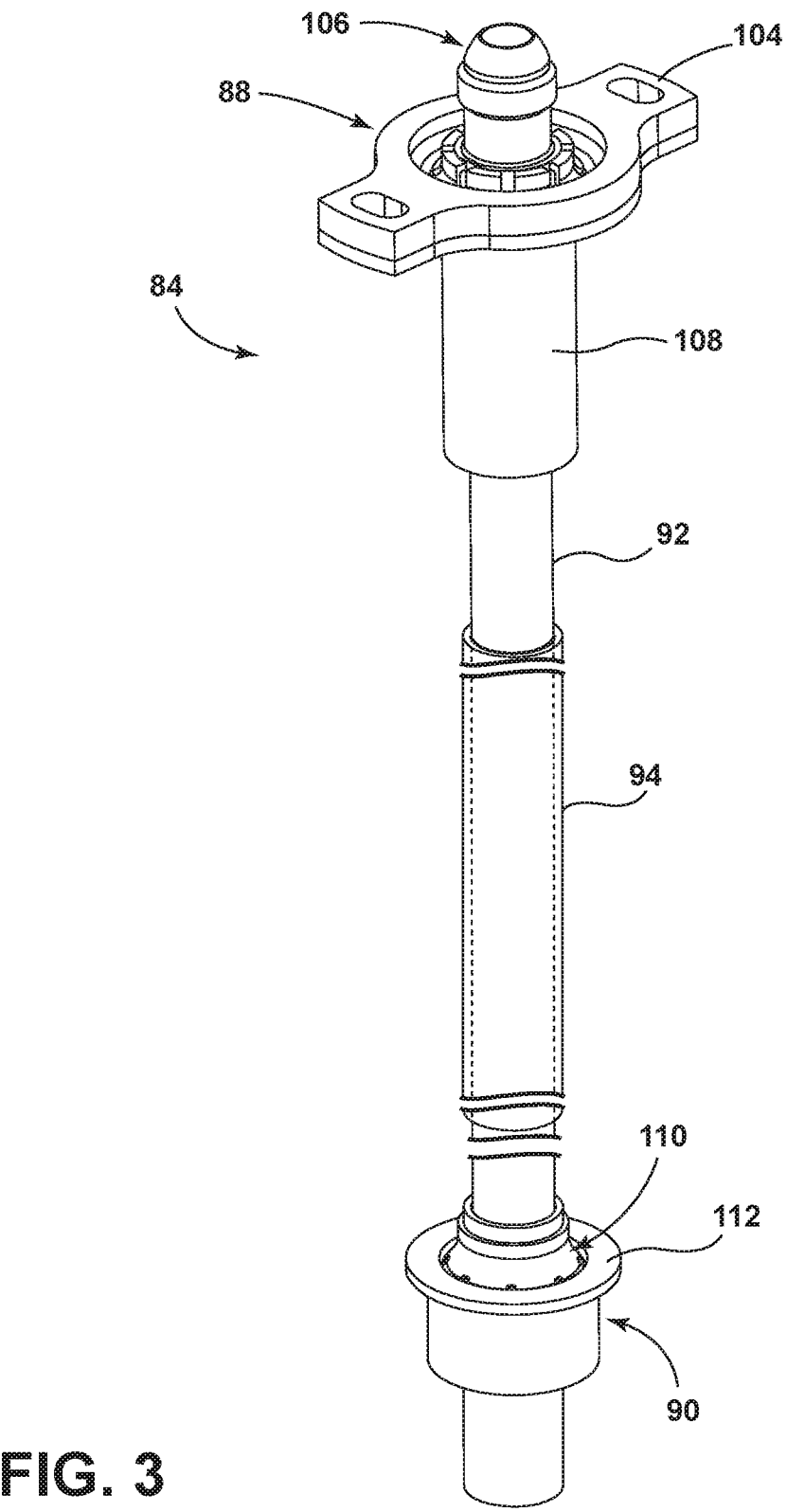
FIG. 3 is a top perspective view of the service tube assembly of FIG. 2.

Looking at FIG. 3, the service tube 92 mounts between the radially outer and inner service fittings 88, 90, having the heat shield 94 surrounding at least a portion of the service tube 92, shielding as much of the service tube 92 as possible. The outer service fitting 88 includes a support mount 104 circumscribing the service tube 92. The support mount 104 can be spaced from the outer service fitting 88 and can be a ring circumscribing the service tube 92. An outer piston assembly 106 couples the service tube 92 to a supply for providing oil or an oil/air mixture to the service tube 92. A first sleeve 108 extends inward from the support mount 104 containing the outer piston assembly 106 therein. Similar to the outer service fitting 88, the inner service fitting 90 includes an inner piston assembly 110 having a second sleeve 112 surrounding the inner piston assembly 110.

Figure 4:
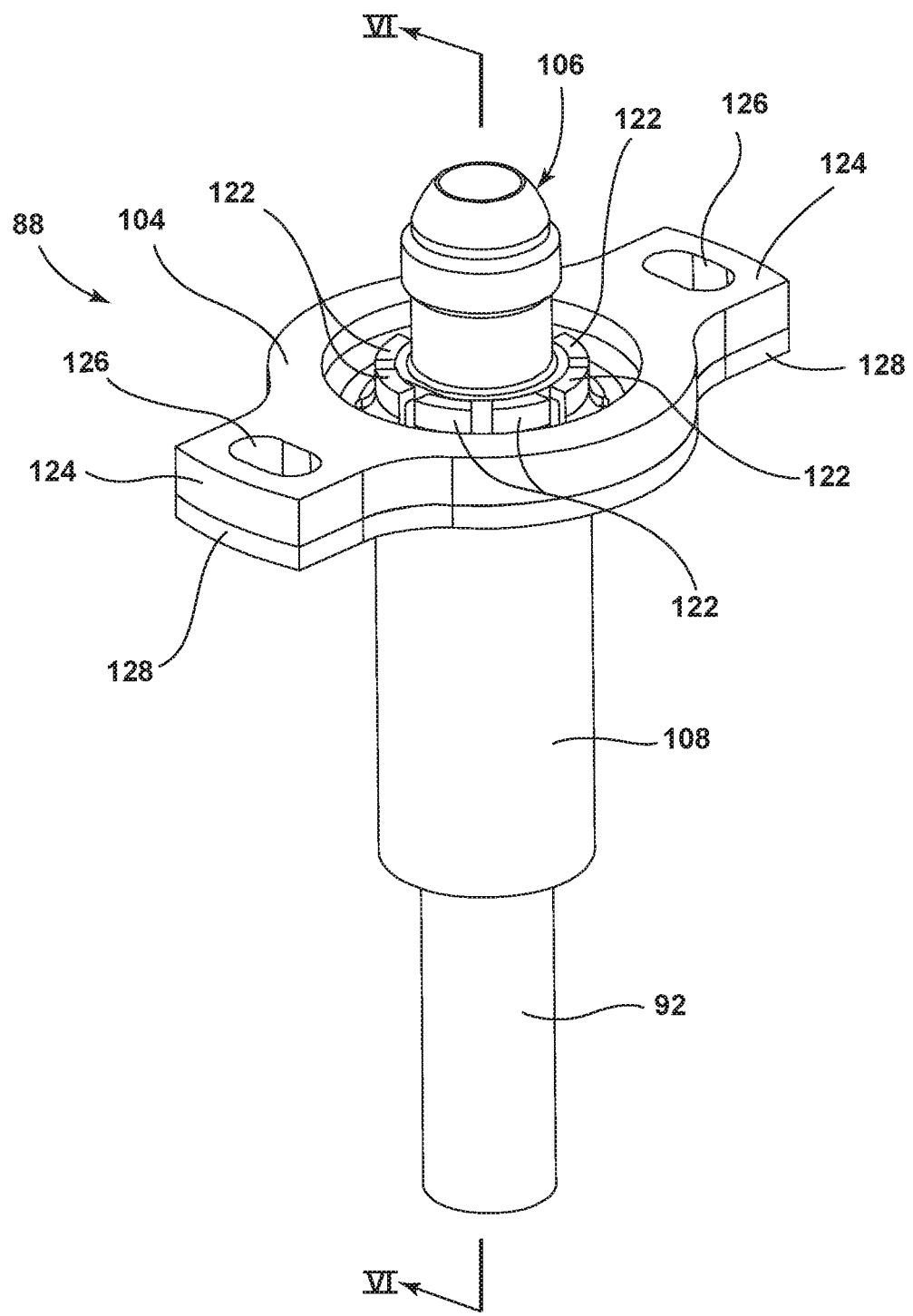
FIG. 4 is a top perspective view an outer diameter support mount for the service tube assembly of FIG. 3.

Looking at FIG. 4, the support mount 104 of the outer service fitting 88 includes a plurality of radially inner spring fingers 122 abutting the outer piston assembly 106. The support mount 104 further includes two mount extensions 124 each having an aperture 126 for mounting the support mount 104 to the sleeve 108 and the casing 46. The sleeve 108 has two sleeve extensions 128 complementary to the mount extensions 124 for mounting thereto. During installation, the support mount 104 can mount between the outer casing 46 and the sleeve 108 securing the support mount 104 relative to the outer piston assembly 106.

Figure 5:
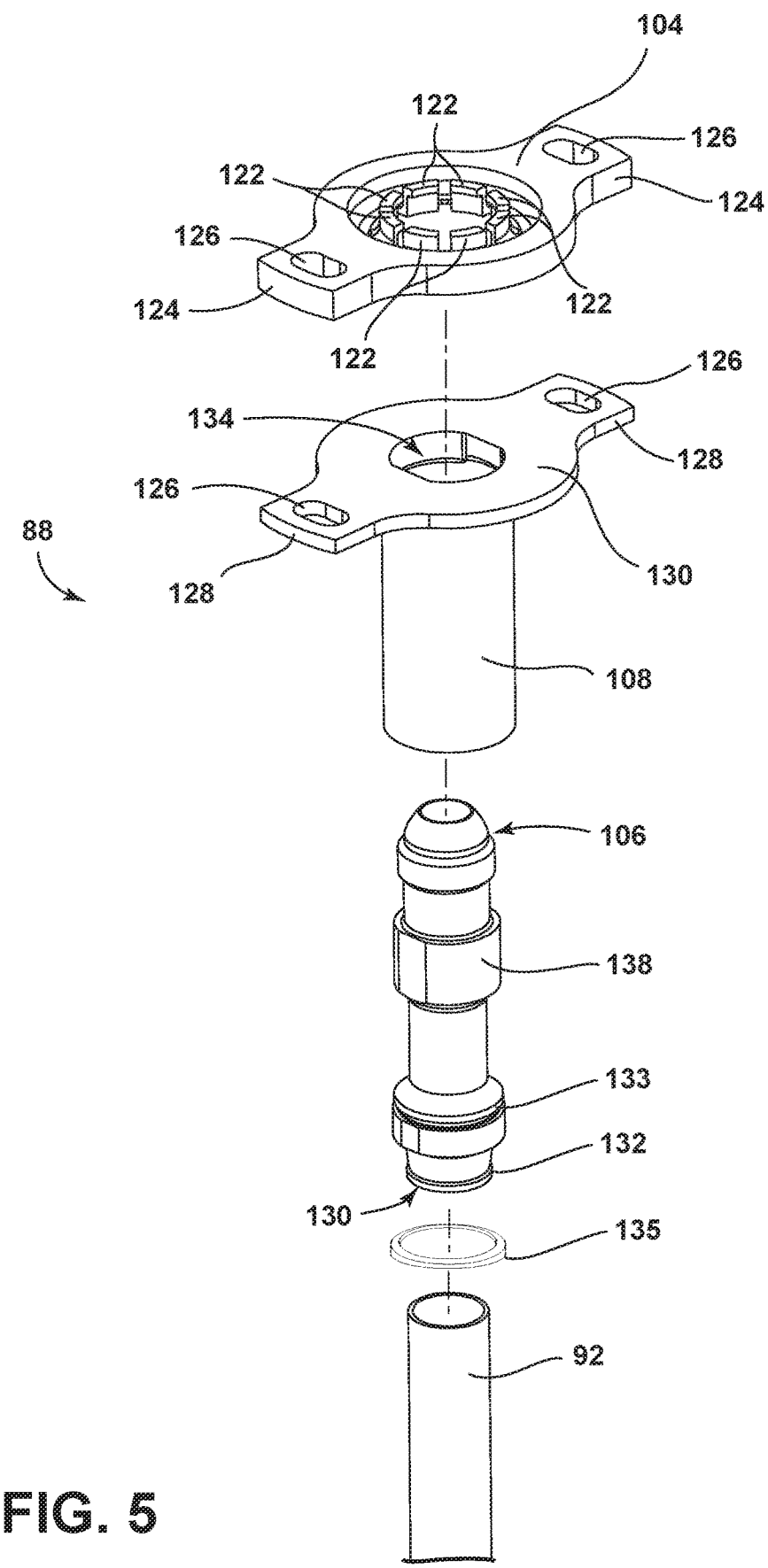
FIG. 5 is an exploded view of the outer diameter support mount of FIG. 4.

An exploded view in FIG. 5 illustrates the combination of the radial outer piston assembly 106 for incorporating the support mount 104. The service tube 92 can mount to an inner end 130 of the piston assembly 106 at a mount ring 132. The piston assembly 106 further includes a channel 133 for receiving a piston seal 135 to seal the piston assembly 106 within the first sleeve 108. The piston assembly 106 is inserted through the sleeve 108 extending out of a piston aperture 134. The piston aperture 134 can be indexed to receive the piston assembly 106 in a keyed manner. The support mount 104 is slid over the piston assembly 106 until the spring fingers 122 abut a spring collar 138 on the piston assembly 106. The spring collar 138 provides a wear surface for the spring fingers 122 to contact the piston assembly 106. The support mount 104 can mount to the sleeve 108 at the apertures 126 to secure the sleeve 108 and the support mount 104 relative to the piston assembly 106.

Figure 6:
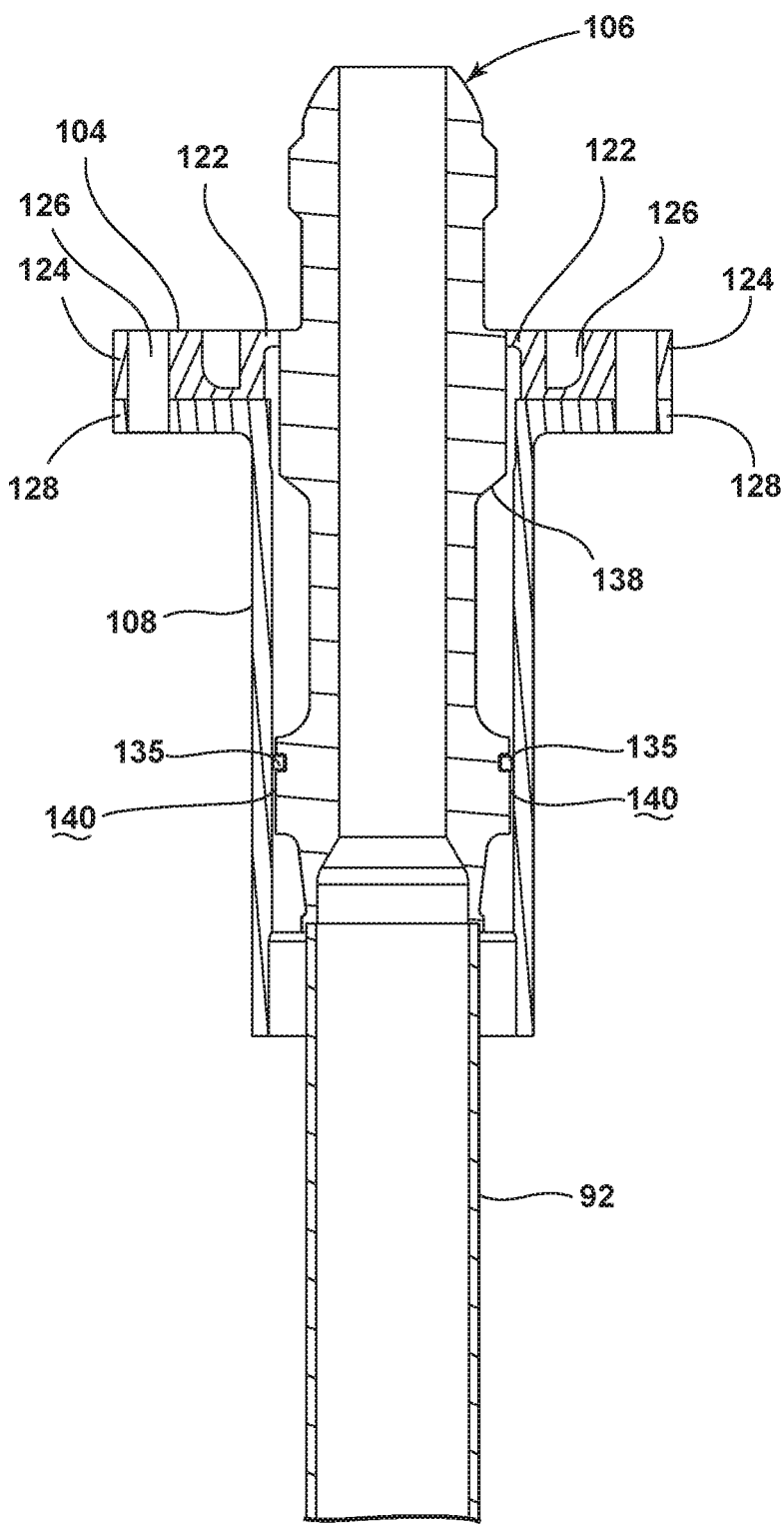
FIG. 6 is a cross-sectional view of the outer diameter support mount of FIG. 4.

In FIG. 6, a cross-sectional view, taken at section VI of FIG. 4, best illustrates the spring fingers 122 contacting the spring collar 138. The piston assembly 106 abuts the support mount 104 at the spring fingers 122. The spring fingers 122 dampen any vibrational movement of the service tube 92. The spring fingers 122 apply a biasing force to the service tube 92 via the piston assembly 106 to position the service tube within the support mount 104. Alternatively, it is contemplated that the spring fingers 122 can directly contact the service tube 92, or that the spring fingers 122 indirectly apply the biasing force to the service tube 92. While a plurality of spring fingers 122 are shown in FIGS. 4 and 5, there need only be at least two opposing spring fingers 122 to apply the biasing force, however there can be any number of spring fingers 122 spaced circumferentially around the service tube 92.

It should be appreciated that the spring fingers 122 as illustrated in FIGS. 4-6 are disposed on the inner diameter of the support mount 104. As such, the support mount 104 can be incorporated into new or previously installed mount assemblies where utilizing an inner diameter spring finger 122 would be advantageous. The spring fingers 122 can have a stiffness or spring force sufficient to drive the resonance frequency of the service tube outside of operational range for the engine 10. The biasing force can be a function of the stiffness or spring force of the spring fingers 122. Thus, the resonant frequency increase resultant of the biasing force can be a function of the stiffness of the spring fingers 122. The resonance frequency for the service tube 92 is increased relative to the spring finger biasing force, pushing the resonance frequency of the service tube 92 out of operational ranges for the engine 10, minimizing contact between the service tube 92 and the heat shield 94 and reducing service tube assembly damage 84. As such, service tube assembly 84 lifetime is increased.

Additionally, the support mount 104 can be installed on existing mount assemblies 88, 90, retrofitting current installations to drive the resonance frequency outside of operational parameters.

Additionally, a second support mount 160 can be used at the radially inner service fitting 90. Utilizing the second support mount 160 can further increase the resonance frequency of the service tube 92 or permit a smaller spring stiffness for the first support mount 104. Looking at FIG. 7, the radial inner service fitting 90 can include the radial inner piston assembly 110 surrounded by the second sleeve 112. The second sleeve 112 can be a hollow, annular tube 150 terminating in a sleeve flange 152 at the radially outer end 154 of the second sleeve 112. The piston assembly 110 includes an outer collar 156 for coupling the service tube 92. The second support mount 160 surrounds the outer collar 156 of the piston assembly 110 having a plurality of spring fingers 162 abutting an inner surface 164 of the second sleeve 112. The spring fingers 162 are disposed on the outer diameter of the second support mount 160, as compared to the spring fingers 122 on the inner diameter of the first support mount 104.

Figure 8:
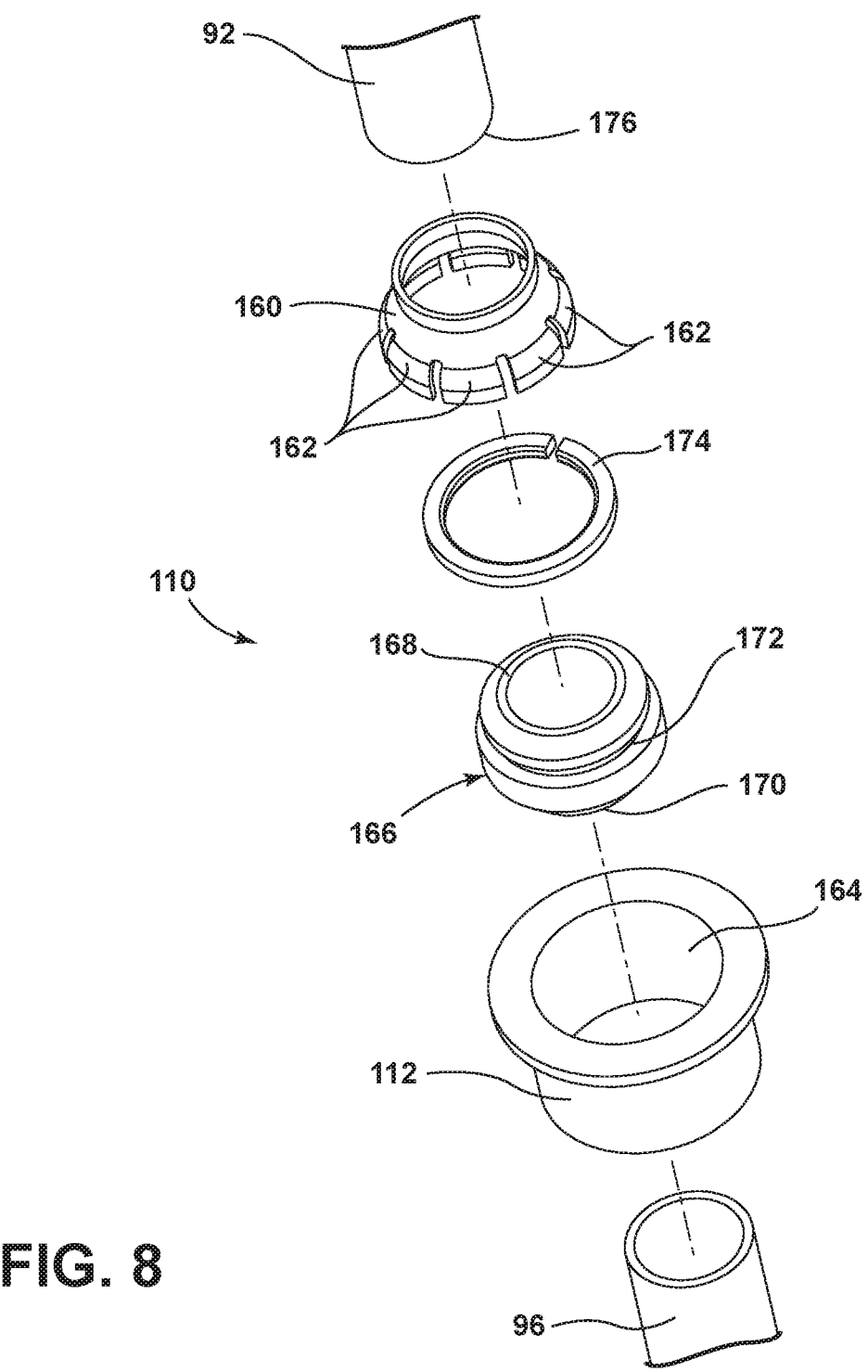
FIG. 8 is an exploded view of the inner diameter support mount of FIG. 7.

FIG. 8 illustrates an exploded view of the radial inner service fitting 90 showing the components included in the inner piston assembly 110. The inner piston assembly 110 includes the second support mount 160 that can slide over the lower portion of the service tube 92. An annular piston collar 166, including an outer end 168 and an inner end 170, has a groove 172 adapted to receive a piston ring 174. The outer end 168 of the piston collar 166 mounts to the inner end 176 of the service tube 92, with the piston ring 174 sealing against the piston collar 166 at the service tube 92. The inner end 170 of the piston ring 172 mounts to the tube conduit 96, fluidly coupling the tube conduit 96 to the service tube 92.

Figure 7:
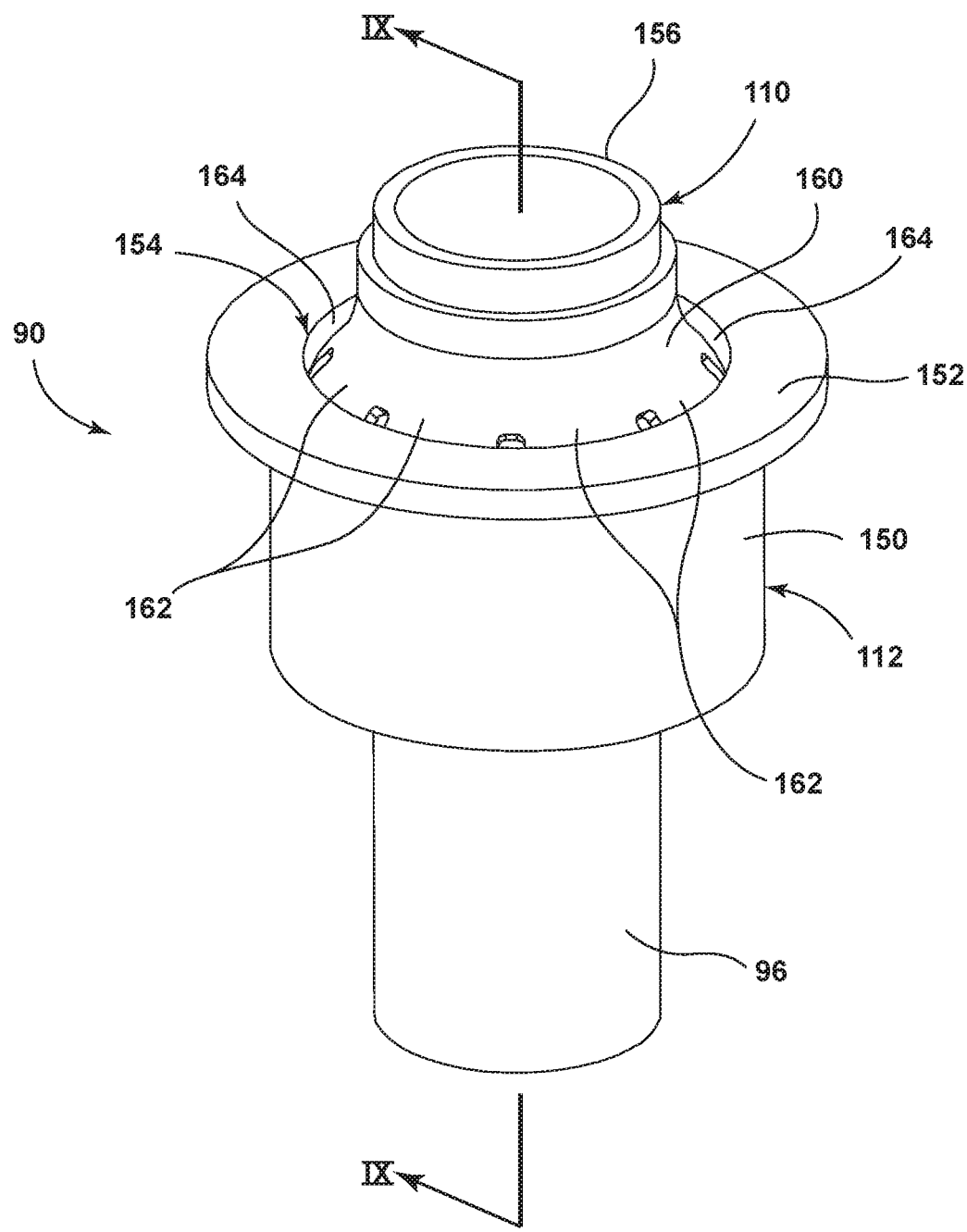
FIG. 7 is top perspective view of an inner diameter support mount for the service tube assembly of FIG. 3.
Figure 9:
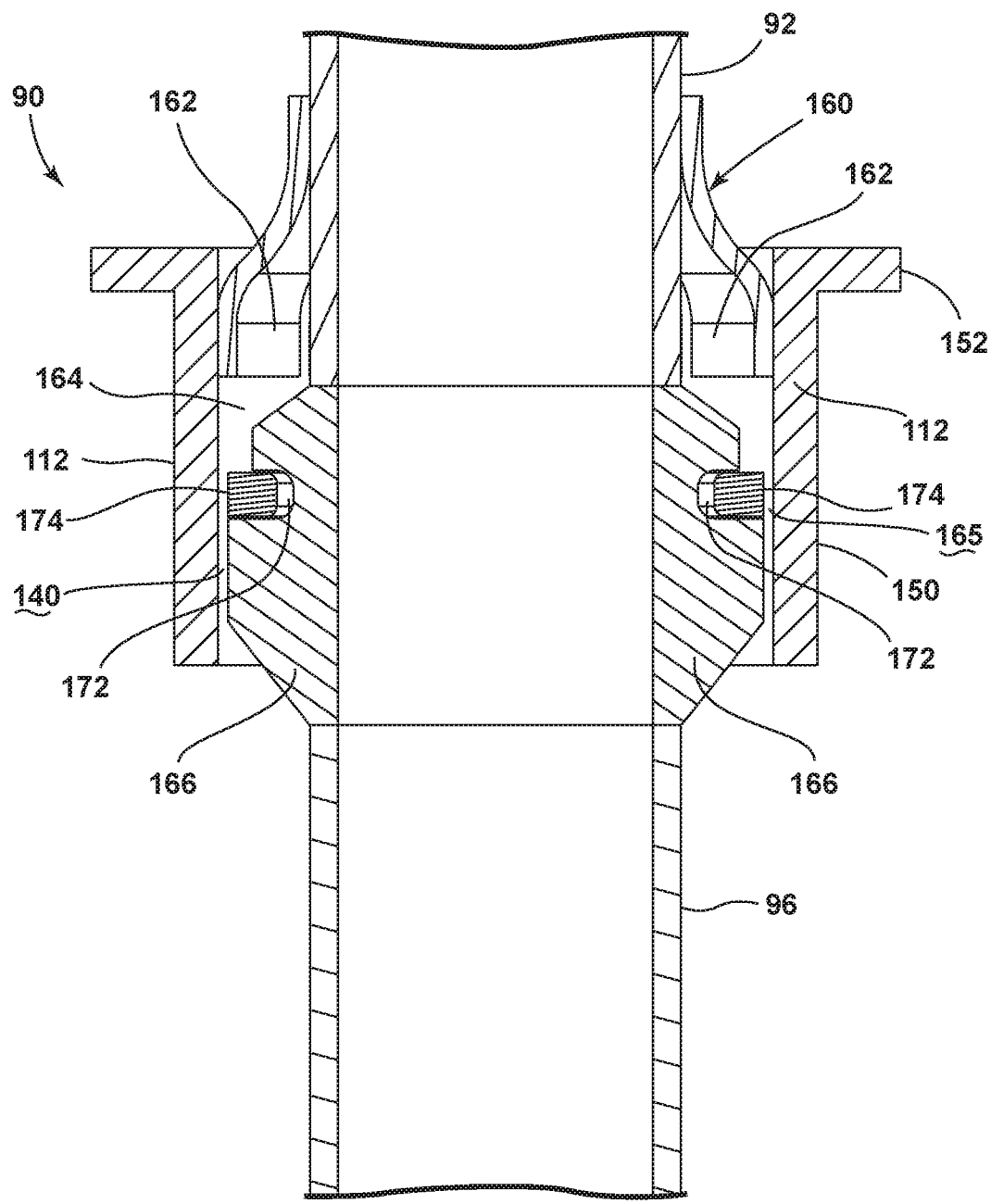
FIG. 9 is a cross-sectional view of the inner diameter support mount of FIG. 7.

FIG. 9, illustrating the cross-section taken at section IX of FIG. 7, shows the second support mount 160 supporting the service tube 92 within the second sleeve 112. The spring fingers 162 abut the inner surface 164 of the second sleeve 112. The inner piston assembly 110 can be spaced from the second sleeve 112 by a gap 165 permitting movement and thermal growth of the service tube 92 during engine operation. The second sleeve 112 can mount within the inner casing assembly 98 for supporting the service tube assembly 84. The second support mount 160 in combination with the first support mount 104 can change the resonance frequency of the service tube assembly 84 greater than that of one support mount alone, moving the resonance frequency further outside of natural operational frequencies during engine operation.

It should be appreciated that for the second support mount 160, the spring fingers 162 are disposed on the outer diameter of the support mount 160. Thus, the second support mount 160 can be installed on existing or new mount systems where mounting the support mount directly to the service tube 92 would be required or beneficial.

The service tube assembly 84 can utilize one or more of the support mounts 104, 160 can drive the resonance frequency of the service tube 92 or the service tube 92 and heat shield 94 combination outside of operational parameters of the engine 10. Additionally, there can be a plurality of support mounts 104, 160 mounted along the length of the service tube 92. Driving the resonance frequencies outside of operational parameters prevents resonance of the service tube 92 and heat shield 94 during operation, which minimizing contact between the two. Minimizing contact reduces service tube wear, which can increase service tube lifetime and reduce the incidence of service tube cracking.

Additionally, a method of altering a first resonance frequency of the service tube 92 can include applying a biasing force to the service tube 92 normal to the longitudinal axis of the service tube 92. Applying the biasing force can include applying biasing forces having at least opposing components, such as the spring fingers 122, 162 disposed circumferentially about the service tube 92. The spring fingers 122, 162 can apply the biasing force at a plurality of discrete points about the circumference of the service tube 92 at the points where the spring fingers 122, 162 contact the service tube 92.

It should be appreciated that utilizing at least one support mount 104, 160 having at least one spring element 122, 162 can be used to apply a biasing force to the service tube 92 within the turbine rear frame 80. The at least one support mount 104, 160 can be utilized at either the radially outer or inner service fitting 88, 90. Thus, the support mount 104 can be utilized in a fitting 88, 90 were inner diameter spring fingers 122 are beneficial, while the support mount 160 having the outer diameter spring fingers 162 can be used where a fitting directly to the service tube 92 is beneficial. Applying the biasing force can drive the resonance frequency of the service tube 92 outside of operational conditions of the engine 10, minimizing resonance of the service tube 92 to prevent contact of the service tube 92 against the heat shield 94 to minimize the incidence of service tube wear and cracking. Service tube lifetime is increased.

It should be further appreciated that the first and second support mounts 104, 160 are designed for retrofit capabilities. As such, the support mounts 104, 160 can be easily installed on current operational engines with minimal maintenance to drive resonance frequencies outside of operational parameters. This is beneficial in providing an immediate solution to current engine service tube assemblies 84 without requiring an engine overhaul or implementation in only new engines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   an engine core having a first service fitting and a second service fitting spaced from the first service fitting;
   a service tube mounted to and extending between the first service fitting and the second service fitting;
   a heat shield surrounding a portion of the service tube;
   a first support mount of the first service fitting and a second support mount of the second service fitting securing the service tube to the engine core, the first support mount or the second support mount including a ring circumscribing the service tube and having a plurality of opposing spring elements spaced circumferentially about the service tube, the plurality of opposing spring elements extending from the ring to apply a biasing force to the service tube to dampen a resonance of the service tube; and
   a piston assembly extending from the service tube, the piston assembly including:
      a mount ring at a first end of the piston assembly, the piston assembly extending from the service tube at the first end, the mount ring configured to mount the piston assembly to the service tube; and a collar between the mount ring and a second end of the piston assembly, the second end opposite the first end, the plurality of opposing spring elements of the first support mount contacting the collar.

2. The gas turbine engine of claim 1 wherein the plurality of opposing spring elements apply a spring force radially relative to a longitudinal axis of the service tube.

3. The gas turbine engine of claim 1 wherein the first support mount or the second support mount secures the service tube to the first service fitting or the second service fitting.

4. The gas turbine engine of claim 1 wherein the a first support mount is coupled to the first service fitting and the second support mount is coupled to the second service fitting.

5. The gas turbine engine of claim 1 wherein the ring is a first ring, the plurality of opposing spring elements are a first plurality of opposing spring elements, and the second support mount includes:
a second ring circumscribing the service tube; and
a second plurality of opposing spring elements extending outwardly from the second ring and constraining the service tube in between.

6. The gas turbine engine of claim 5 wherein the piston assembly is a first piston assembly, the collar is a first collar, and the second ring is mounted to the service tube, the gas turbine engine further includes:
a sleeve, the sleeve slid over the service tube and the second ring and secured to the second ring, the second plurality of opposing spring elements abut the sleeve; and
a second piston assembly including a second collar, the sleeve circumscribing the second collar and the service tube.

7. A service tube assembly for a turbine engine for providing a fluid about the turbine engine, the service tube assembly comprising:
a first service fitting;
a second service fitting spaced from the first service fitting;
a service tube extending between the first service fitting and the second service fitting;
a heat shield surrounding a portion of the service tube;
a first support mount of the first service fitting, the first support mount including a first ring circumscribing the service tube and having a first plurality of opposing spring elements spaced circumferentially about the service tube and integral with the first support mount, the first plurality of opposing spring elements extending from the first ring to apply a biasing force to the service tube to dampen resonance of the service tube;
a piston assembly extending from the service tube;
a mount ring at a first end of the piston assembly, the piston assembly extending from the service tube at the first end, the mount ring configured to mount the piston assembly to the service tube;
a collar between the mount ring and a second end of the piston assembly, the second end opposite the first end, the first plurality of opposing spring elements of the first support mount contacting the collar; and
a second support mount coupled to the second service fitting, the second support mount including a second ring circumscribing the service tube and a second plurality of opposing spring elements spaced circumferentially about the service tube and integral with the second support mount, the second plurality of opposing spring elements extending from the second ring to apply a biasing force to the service tube to dampen resonance of the service tube.

8. The service tube assembly of claim 7 wherein the first plurality of opposing spring elements on the first support mount and the second plurality of opposing spring elements on the second support mount each apply a spring force radially relative to a longitudinal axis of the service tube.

9. The service tube assembly of claim 7 wherein the second plurality of opposing spring elements extend from the second ring and constrain the service tube in between.

10. A service tube assembly comprising:
a first service fitting;
a second service fitting spaced from the first service fitting;
a service tube extending between the first service fitting and the second service fitting;
a heat shield surrounding a portion of the service tube;
a first support mount coupled to the first service fitting, the first support mount including
a first ring circumscribing the service tube, the first support mount including a first plurality of opposing spring elements spaced circumferentially about the service tube and extending from the first ring to apply a biasing force to the service tube to dampen resonance of the service tube;
a piston assembly extending from the service tube towards the first support mount;
a mount ring at a first end of the piston assembly, the piston assembly extending from the service tube at the first end, the mount ring configured to mount the piston assembly to the service tube; and
a collar between the mount ring and a second end of the piston assembly, the second end opposite the first end, the first plurality of opposing spring elements of the first support mount contacting the collar.

11. The service tube assembly of claim 10 wherein the first service fitting includes a first sleeve circumscribing the service tube.

12. The service tube assembly of claim 10 wherein the first support mount circumscribes the service tube.

13. The service tube assembly of claim 10 wherein the piston assembly includes a piston seal, and the first service fitting includes a first sleeve circumscribing and spaced from at least a portion of the service tube with the piston seal abutting the first sleeve.

14. The service tube assembly of claim 10 wherein the first service fitting includes a first sleeve extending from the first support mount.

15. The service tube assembly of claim 14 further comprising a second support mount coupled to the second service fitting, wherein the second service fitting includes a second sleeve extending from the second support mount.

16. The service tube assembly of claim 15, wherein the piston assembly is a first piston assembly, the first piston assembly is provided at least partially within the first sleeve, and the service tube assembly further including a second piston assembly provided at least partially within the second sleeve.

17. The service tube assembly of claim 16 further comprising a first piston seal provided about the first piston assembly and a second piston seal provided about the second piston assembly, with the first piston seal abutting the first sleeve and the second piston seal abutting the second sleeve.

18. The service tube assembly of claim 15 wherein the second support mount includes a second plurality of opposing spring elements abutting the second sleeve.

19. The service tube assembly of claim 10, further including a second support mount coupled to the second service fitting, the second support mount including a second ring circumscribing the service tube and a second plurality of opposing spring elements spaced circumferentially about the service tube and integral with the second support mount, the second plurality of opposing spring elements extending from the second ring to apply a biasing force to the service tube to dampen resonance of the service tube.

\* \* \* \* \*